(12) United States Patent
Yamaguchi et al.

(10) Patent No.: US 12,683,299 B2
(45) Date of Patent: Jul. 14, 2026

(54) CONNECTOR

(71) Applicant: Yazaki Corporation, Tokyo (JP)

(72) Inventors: Yasuhiro Yamaguchi, Kakegawa (JP);
Naoki Mamashita, Kakegawa (JP)

(73) Assignee: YAZAKI CORPORATION, Tokyo
(JP)

( * ) Notice: Subject to any disclaimer, the term of this
patent is extended or adjusted under 35
U.S.C. 154(b) by 352 days.

(21) Appl. No.: 18/602,699

(22) Filed: Mar. 12, 2024

(65) Prior Publication Data

US 2024/0313432 A1      Sep. 19, 2024

(30) Foreign Application Priority Data

Mar. 13, 2023      (JP) ................................. 2023-038470

(51) Int. Cl.
*H01R 4/18* (2006.01)
*B60L 53/16* (2019.01)

(52) U.S. Cl.
CPC .............. *H01R 4/183* (2013.01); *B60L 53/16*
(2019.02)

(58) Field of Classification Search
CPC ................................ H01R 4/183; B60L 53/16
USPC ................................................ 439/485, 487
See application file for complete search history.

(56) References Cited

U.S. PATENT DOCUMENTS

| | | | | |
|---|---|---|---|---|
| 10,985,494 | B2 * | 4/2021 | Iwami ................... | H01R 13/521 |
| 2005/0178576 | A1 * | 8/2005 | Saka ................... | H01R 13/5227 |
| | | | | 174/66 |
| 2012/0295460 | A1 * | 11/2012 | Ichio ...................... | H01R 13/74 |
| | | | | 439/205 |
| 2013/0078846 | A1 * | 3/2013 | Sasaki ..................... | B60L 53/31 |
| | | | | 439/374 |
| 2015/0325948 | A1 * | 11/2015 | Kurita ..................... | B60L 53/16 |
| | | | | 439/206 |
| 2020/0153157 | A1 | 5/2020 | Iwami et al. | |
| 2022/0069508 | A1 * | 3/2022 | Hashimoto .............. | H02J 7/00 |
| 2022/0216654 | A1 * | 7/2022 | Hashimoto ............. | B60L 53/16 |
| 2022/0416471 | A1 * | 12/2022 | Yamaguchi .......... | H01R 13/512 |

* cited by examiner

*Primary Examiner* — Gary F Paumen
(74) *Attorney, Agent, or Firm* — Sughrue Mion, PLLC

(57) ABSTRACT

The connector is attached to the vehicle body of an electric
vehicle, a hybrid vehicle, and the like, and mates with a
charging plug provided on a charging station to charge the
battery on the vehicle. The connector includes a terminal
crimped to an end of an electric wire, a heat storage member
surrounding an electric wire-crimped portion of the termi-
nal, a housing, and a heat transfer member in a sheet shape.
The electric wire-crimped portion is formed with a recessed
portion that is a crimping dent during crimping of the
electric wire. The heat storage member includes a first heat
storage member and a second heat storage member that are
attached to each other with the electric wire-crimped portion
being interposed therebetween. The heat transfer member is
interposed between the first heat storage member and the
electric wire-crimped portion. A protruding portion formed
on the second heat storage member is positioned within the
recessed portion to be in contact with the recessed portion.

3 Claims, 7 Drawing Sheets

CONNECTOR

TECHNICAL FIELD

The present invention relates to a connector.

BACKGROUND

The vehicle body of an electric vehicle, a hybrid vehicle, and the like has a connector for charging a battery mounted on the vehicle body (see Patent Document 1, for example). The connector mates with a charging plug provided on a charging station or the like, and includes terminals connected to the ends of the electric wires and a housing accommodating the terminals. Such connectors may be referred to as "charging inlets".

RELATED ART

Patent Document

Patent Document 1: JP 2020-77573 A

SUMMARY OF THE INVENTION

Problem to be Solved by the Invention

Such connectors are handling higher currents due to an increase in the battery capacity and the need for a shorter charging time, and there is a problem in that, during charging, the temperature of the terminals rises rapidly due to heat generated from areas with a higher resistance, such as a contact portion with a charging plug and a connection portion with an electric wire.

Accordingly, it is an object of the present disclosure to provide a connector that can alleviate the rise in the temperature of terminals.

Solution to Problem

According to an embodiment of the present disclosure, a connector includes a terminal crimped to an end of an electric wire, a heat storage member surrounding an electric wire-crimped portion of the terminal, a housing accommodating the terminal and the heat storage member, and a heat transfer member in a sheet shape, wherein the electric wire-crimped portion is formed with a recessed portion that is a crimping dent during crimping of the electric wire, the heat storage member includes a first heat storage member and a second heat storage member that are attached to each other with the electric wire-crimped portion being interposed therebetween, the heat transfer member is interposed between the first heat storage member and the electric wire-crimped portion, and a protruding portion formed on the second heat storage member is positioned within the recessed portion to be in contact with the recessed portion.

Advantageous Effects of the Invention

According to the present invention, the rise in the temperature of terminals can be alleviated.

DETAILED DESCRIPTION OF THE EXEMPLARY EMBODIMENT

A connector 1 according to an embodiment of the present invention is hereinafter described with reference to FIGS. 1 to 7.

Figure 1:
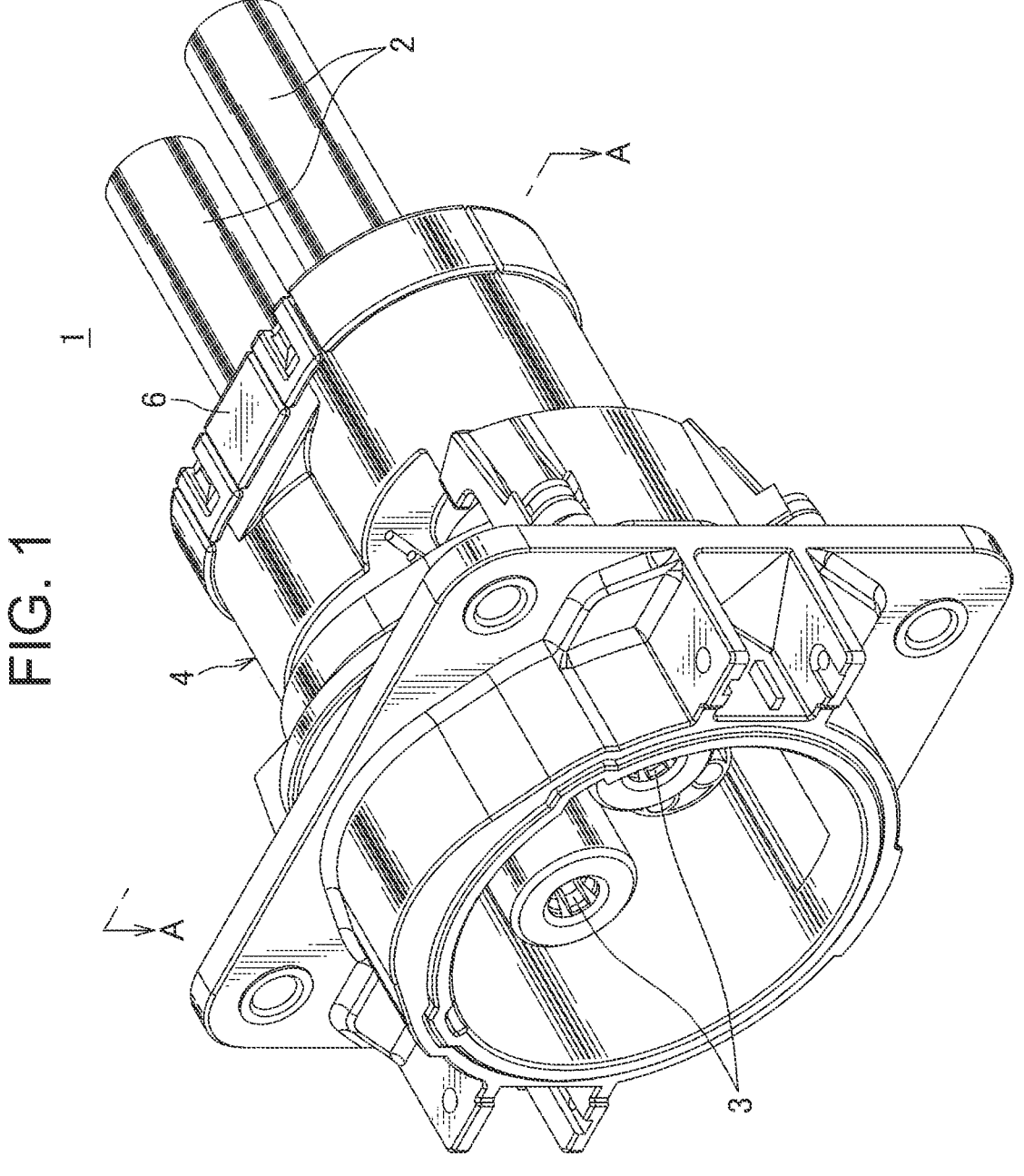
FIG. 1 is a perspective view illustrating a connector according to an embodiment of the present invention.
Figure 2:
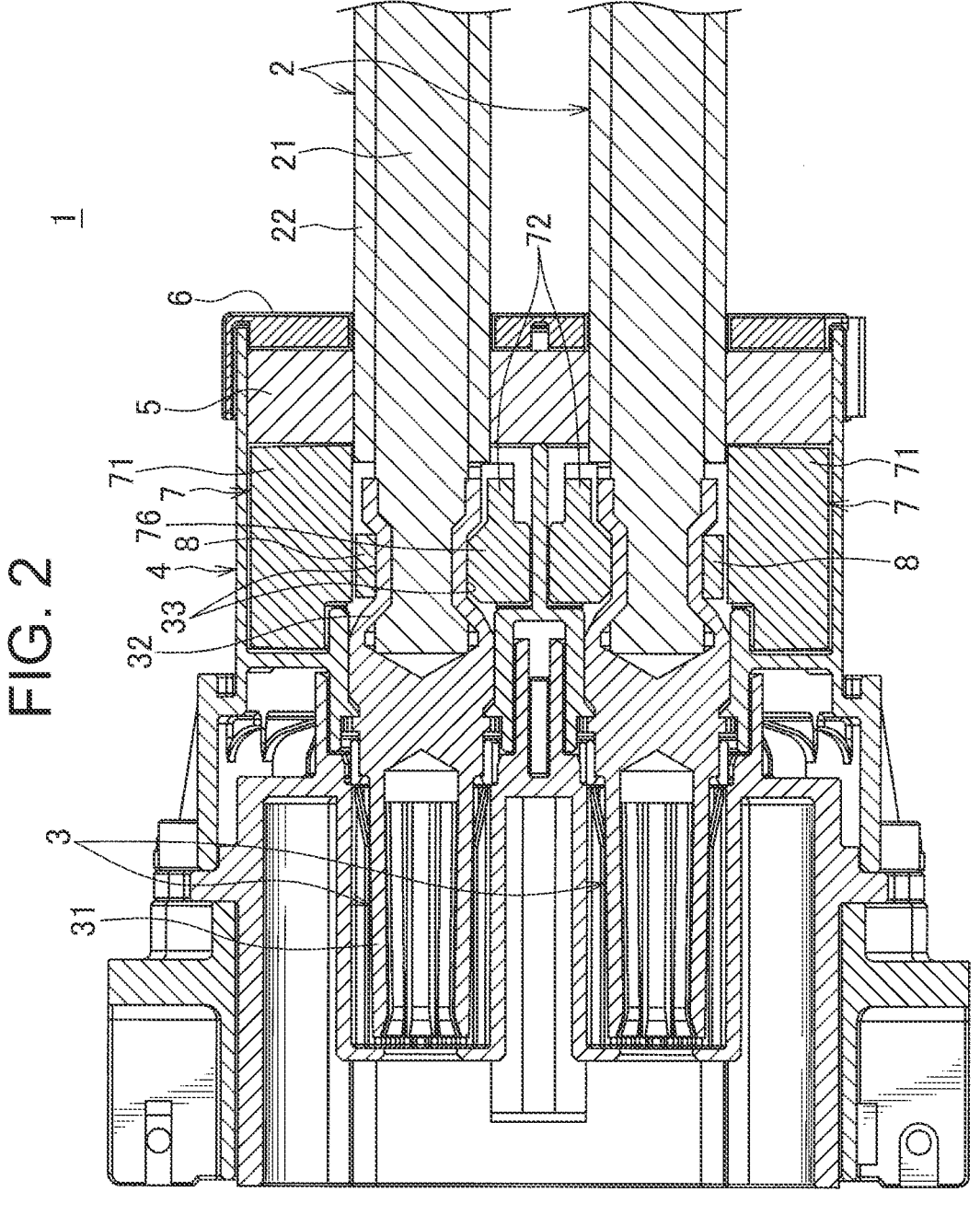
FIG. 2 is a cross-sectional view taken along line A-A of FIG. 1.
Figure 3:
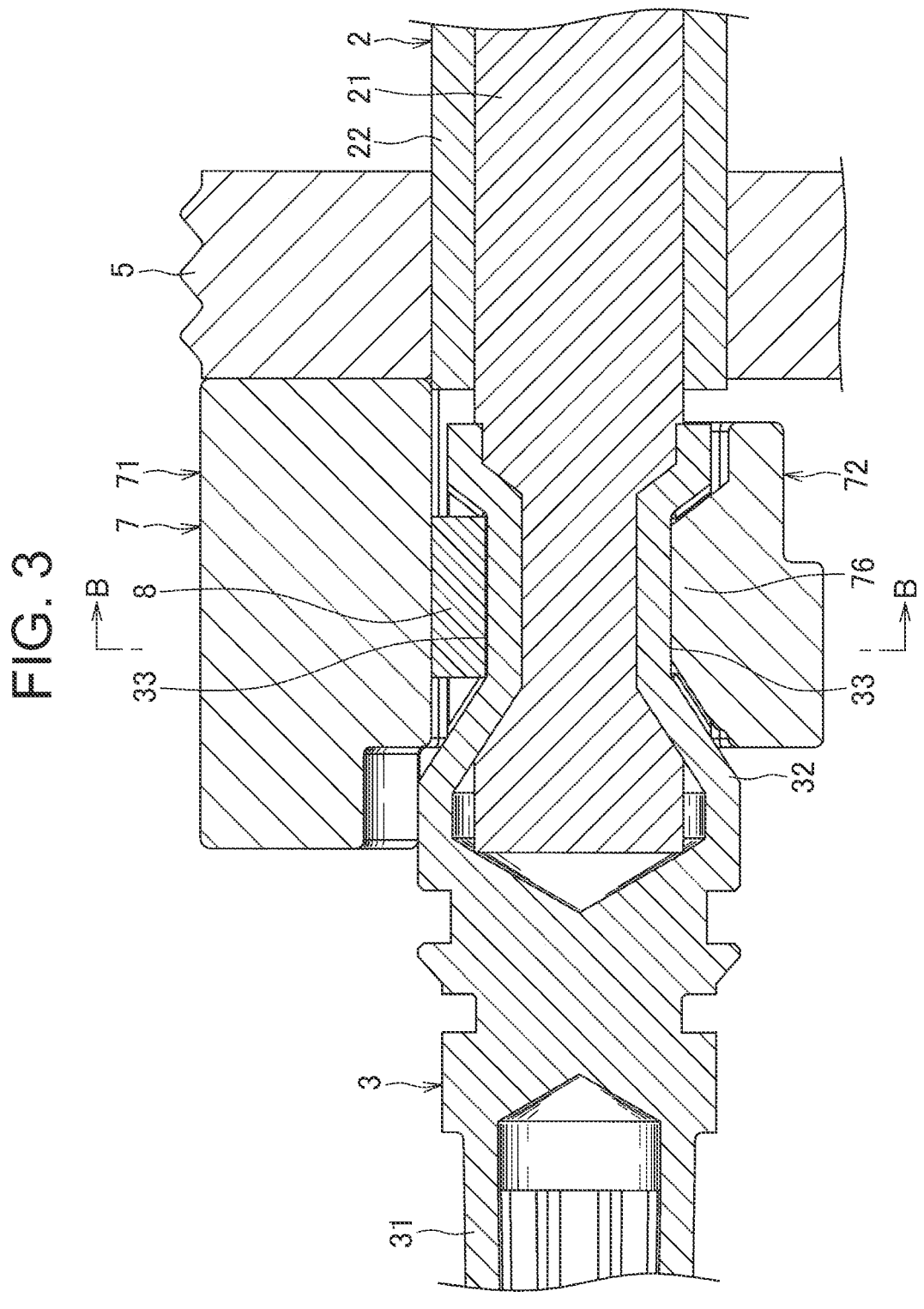
FIG. 3 is an enlarged view of the main portion of FIG. 2.
Figure 4:
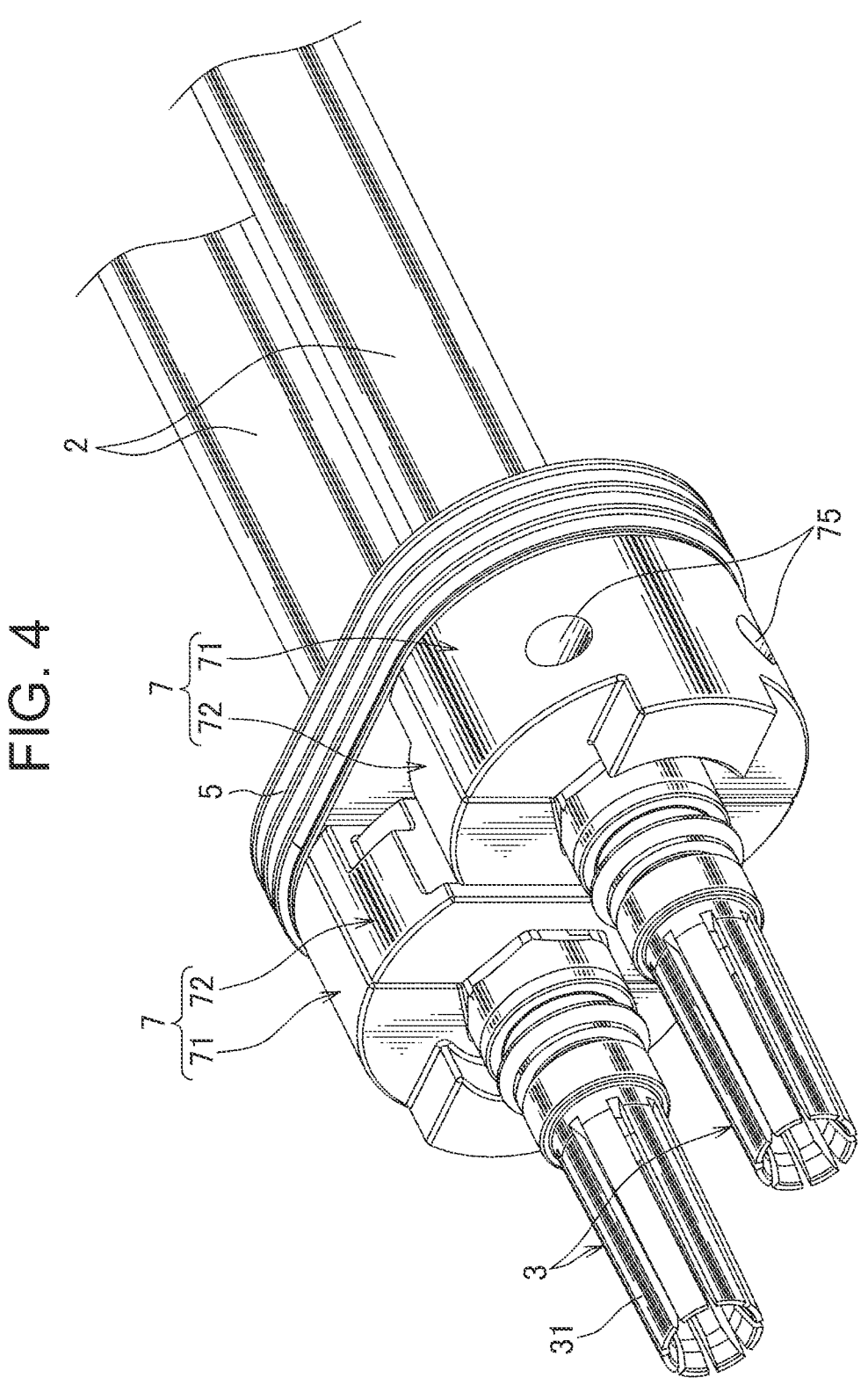
FIG. 4 is a perspective view illustrating an assembled body including terminal-attached electric wires, a heat storage member, and a rubber plug, which constitute the connector of FIG. 2.
Figure 5:
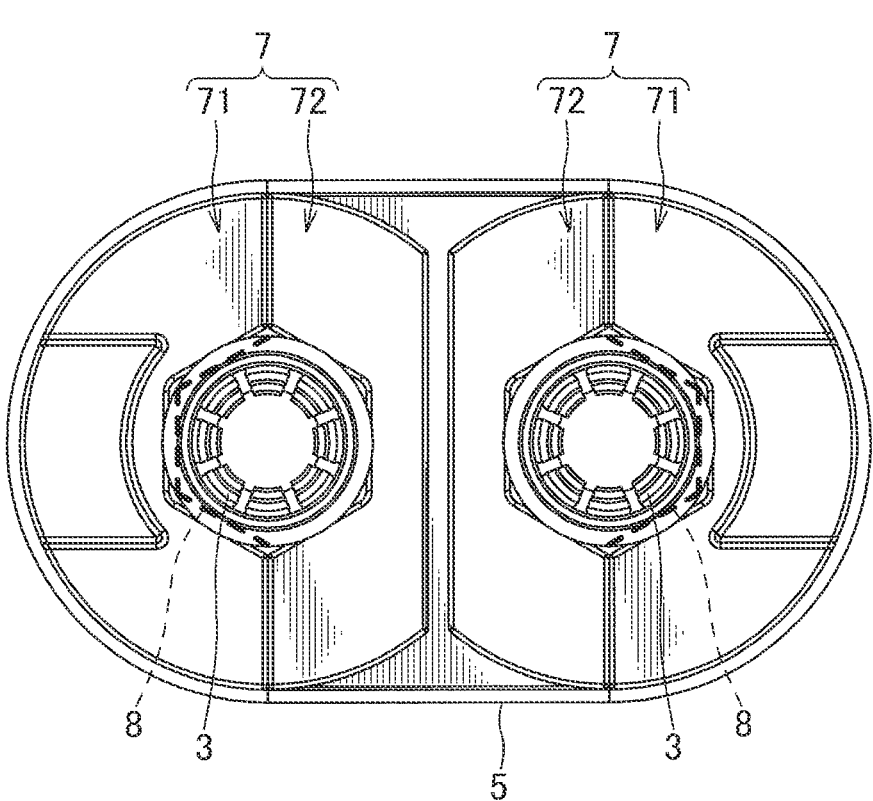
FIG. 5 is a front view of the assembly illustrated in FIG. 4.

The connector 1 illustrated in FIGS. 1, 2 is attached to the vehicle body of an electric vehicle, a hybrid vehicle, and the like, and mates with a charging plug provided on a charging station to charge the battery on the vehicle. This connector 1 may also be referred to as a "charging inlet".

The connector 1 includes terminals 3 crimped to the ends of electric wires 2, heat storage members 7 surrounding electric wire-crimped portions 32 of the terminals 3, a synthetic resin housing 4 accommodating the terminals 3 and the heat storage members 7, heat transfer members 8, a rubber plug 5, and a holder 6.

The connector 1 according to the present embodiment is connected to two electric wires 2. Therefore, the connector 1 includes two terminals 3 and two heat storage members 7. The two terminals 3 are components of the same type, and the two heat storage members 7 are components of the same type.

The rubber plug 5 is attached to the rear side of the housing 4 (a side with where the charging plug mates is defined as the front side) to seal between the inner surface of the housing 4 and the outer surface of the electric wire 2. The holder 6 is for preventing the rubber plug 5 from falling off from the housing 4. In this way, the connector 1 sealed by the rubber plug 5 has a structure that allows heat to easily stay inside the housing 4.

The electric wire 2 is a round electric wire including a core wire 21 and an insulation coating 22. At the end of the electric wire 2, the insulation coating 22 is removed and the core wire 21 is exposed. The electric wire-crimped portion 32 of the terminal 3 is crimped to the exposed portion of the core wire 21.

Figure 6:
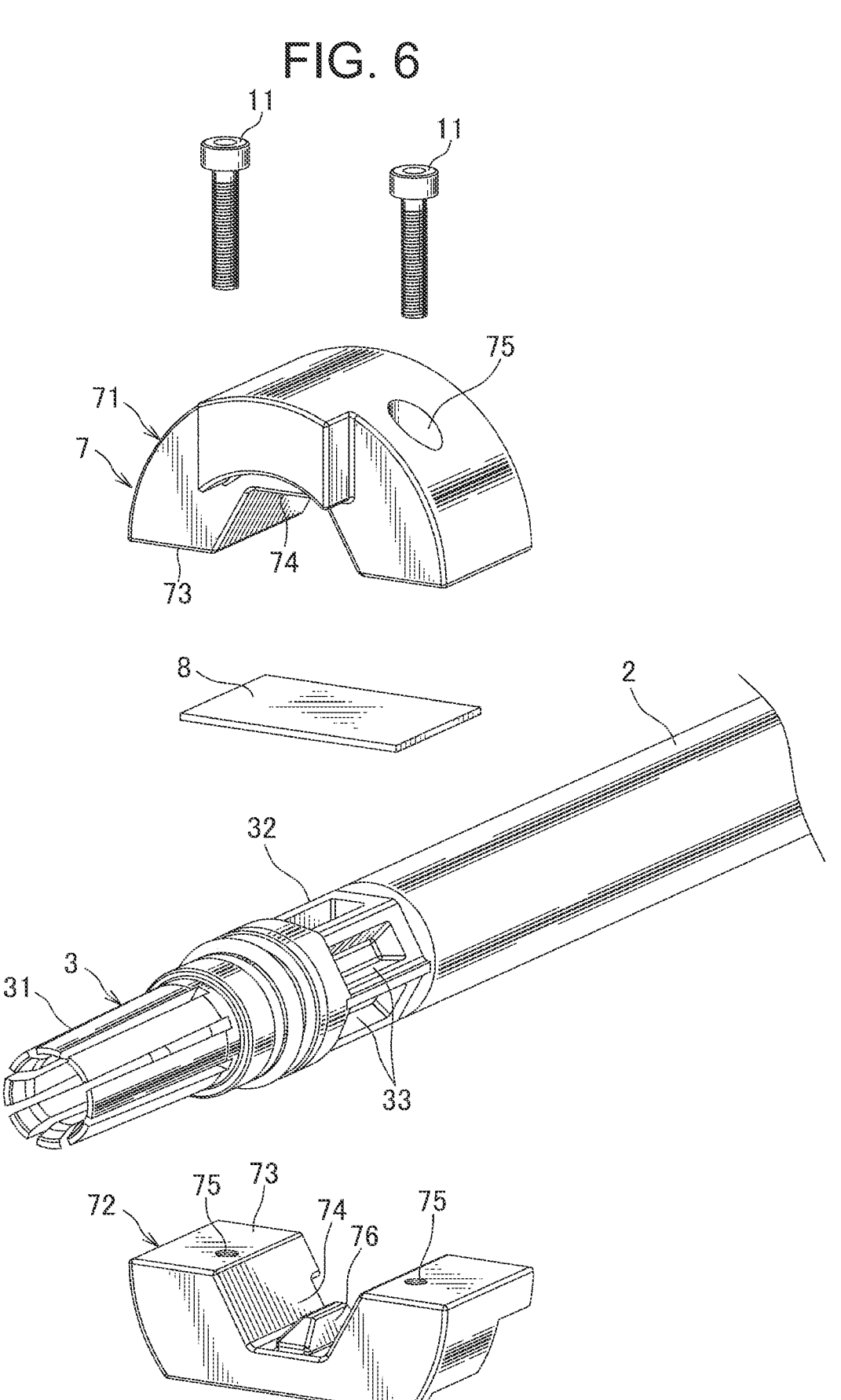
FIG. 6 is an exploded view of the assembly illustrated in FIG. 4.

The terminal 3 includes a first connection portion 31 mating with a mating terminal provided in the charging plug and an electric wire-crimped portion 32 crimped to the core wire 21 of the electric wire 2. The electric wire-crimped portion 32 before crimping is formed into a hollow cylindrical shape with an opening on the side opposite to the first connection portion 31. As illustrated in FIG. 6, the electric wire-crimped portion 32 after crimping has a plurality of recessed portions 33 formed in the circumferential direction, which are crimping dents made during crimping of the electric wire.

As illustrated in FIGS. 4 to 7, the heat storage member 7 includes a first heat storage member 71 and a second heat storage member 72 attached to each other with the electric wire-crimped portion 32 interposed therebetween. In the present embodiment, the first heat storage member 71 and the second heat storage member 72 are attached to each other by fastening two bolts 11 into the first heat storage member 71 and the second heat storage member 72.

As illustrated in FIG. 6, the first heat storage member 71 and the second heat storage member 72 include a contact surface 73 that comes into contact when attached, a groove 74 for positioning the electric wire-crimped portion 32, and bolt holes 75 in which the bolts 11 are fastened.

Furthermore, a protruding portion 76 protruding from the inner surface of the groove 74 toward the first heat storage member 71 is formed on the second heat storage member 72. The protruding portion 76 is formed to have a trapezoidal cross section, which is a shape that imitates the recessed portion 33 of the terminal 3. During assembly of the connector 1, the second heat storage member 72 is positioned at the terminal 3 by positioning this protruding portion 76 within the recessed portion 33. Further, the end surface of the protruding portion 76 is in contact with the inner surface of the recessed portion 33. Thereby, heat generated in the electric wire-crimped portion 32 during charging is efficiently transferred from this contact surface to the second heat storage member 72.

Figure 7:
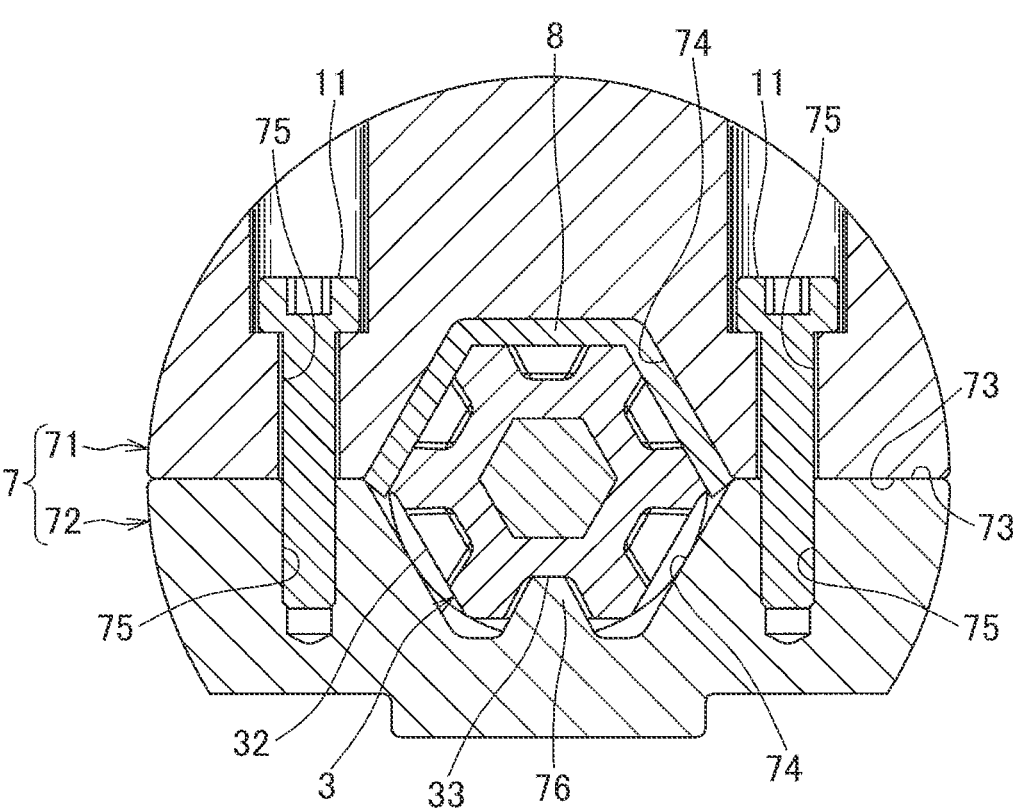
FIG. 7 is cross-sectional view taken along line BB of FIG. 3.

The heat transfer member 8 is an elastic sheet containing a thermally conductive filler. In this example, a silicone rubber sheet containing aluminum oxide powder is used. As illustrated in FIG. 7, the heat transfer member 8 is interposed between the first heat storage member 71 and the electric wire-crimped portion 32. The heat transfer member 8 efficiently transfers heat generated in the electric wire-crimped portion 32 to the first heat storage member 71 during charging.

In the present embodiment, since the first heat storage member 71 and the second heat storage member 72 are attached to each other by fastening the bolts 11, the axial force of the bolts 11 can ensure surface pressure at the contact surface between the recessed portion 33 of the terminal 3 and the protruding portion 76 of the second heat storage member 72. Similarly, the heat transfer member 8 interposed between the first heat storage member 71 and the electric wire-crimped portion 32 can be compressed by the axial force of bolts 11, and the surface pressure can be ensured (see FIG. 3, 7). Furthermore, since a configuration in which the first heat storage member 71 and the second heat storage member 72 are attached to each other by fastening the bolts 11 is employed, it is not necessary to pass the electric wire 2 through the heat storage member 7 in advance, and the ease of assembling the connector 1 can be improved.

As illustrated in FIG. 2, 5, the two heat storage members 7 described above are housed in the housing 4 in such an orientation that the second heat storage members 72 are adjacent to each other and that the first heat storage members 71 are separated from each other.

When the charging plug mates with the connector 1 to start charging, heat is generated from the electric wire-crimped portion 32, which is a part with a high resistance, but this heat is stored in the heat storage member 7, so that the temperature rise of the terminal 3 is alleviated, and the rate of rise in the temperature of the terminal 3 is slowed down. In this way, the temperature rise of the terminal 3 can be alleviated by the heat storage members 7, and therefore, it is possible to avoid adding a cooling structure and increasing the diameter of the electric wires, and avoid increasing the cost and weight of the connector 1.

In the present embodiment, as described above, the two heat storage members 7 are arranged such that the second heat storage members 72 together in the center of the housing 4, and the heat transfer member 8 and the first heat storage member 71 are arranged closer to the outside of the housing 4. In the center of the housing 4, heat from the terminals 3 interferes with each other, and the temperature of the heat storage member 7 tends to saturate. Therefore, as a result of this arrangement, the temperature saturation of the second heat storage member 72 is alleviated, and heat dissipation from the first heat storage member 71 to the outside of housing 4 is improved, which makes it difficult to saturate the temperature of the heat storage members 7, and enables heat to be absorbed efficiently.

The above-described embodiment merely shows a typical form of the present invention, and the present invention is not limited to this embodiment. That is, various modifications can be made without departing from the gist of the invention. It is to be understood that such modifications are included within the scope of the present invention as long as they still have the structure of the present invention.

LIST OF REFERENCE SIGNS

1 connector
2 electric wire
3 terminal
4 housing
5 rubber plug
6 holder
7 heat storage member
8 heat transfer member

What is claimed is:

1. A connector comprising:
a terminal crimped to an end of an electric wire;
a heat storage member surrounding an electric wire-crimped portion of the terminal;
a housing accommodating the terminal and the heat storage member; and
a heat transfer member in a sheet shape,
wherein the electric wire-crimped portion is formed with a recessed portion that is a crimping dent during crimping of the electric wire,
the heat storage member includes a first heat storage member and a second heat storage member that are attached to each other with the electric wire-crimped portion being interposed therebetween,
the heat transfer member is interposed between the first heat storage member and the electric wire-crimped portion, and
a protruding portion formed on the second heat storage member is positioned within the recessed portion to be in contact with the recessed portion.

2. The connector according to claim 1, wherein the first heat storage member and the second heat storage member are attached to each other by fastening a bolt into the first heat storage member and the second heat storage member.

3. The connector according to claim 1, comprising:
two terminals; and
two heat storage members,
wherein the two heat storage members are housed in the housing in such an orientation that the second heat storage members of the two heat storage members are adjacent to each other and that the first heat storage members of the two heat storage members are separated from each other.

* * * * *